United States Patent [19]

Shepherd et al.

[11] 4,163,978
[45] Aug. 7, 1979

[54] RADIO DIRECTION FINDING

[75] Inventors: Eric G. Shepherd; Roger D. Spragg, both of Cheltenham, England

[73] Assignee: The Secretary of State for Defence in Her Britannic Majesty's Government of the United Kingdom of Great Britain and Northern Ireland, London, England

[21] Appl. No.: 855,584

[22] Filed: Nov. 29, 1977

[30] Foreign Application Priority Data

Dec. 2, 1976 [GB] United Kingdom ............... 50368/76

[51] Int. Cl.² .............................................. G01S 5/04
[52] U.S. Cl. .................................. 343/120; 343/113 R
[58] Field of Search .................... 343/115, 113 R, 124, 343/120

[56] References Cited

U.S. PATENT DOCUMENTS 3,973,262  8/1976  Bohm ............................. 343/113 R Primary Examiner—Theodore M. Blum
Attorney, Agent, or Firm—Pollock, Vande Sande and Priddy

[57] ABSTRACT

An automatic radio direction finding method and apparatus which employs a scanning directional wide aperture aerial system, a receiver, and a computer which effectively simulates the methods of a skilled direction finding operator in determining the direction of arrival of a radio wave using all the pattern information derived from the aerial system. A representation of the amplitude distribution of the receiver output signal as a function of the direction of maximum sensitivity of the scanning aerial system is stored, and the computer then determines the point about which this distribution is most symmetrical using an algorithm which folds the distribution, in sampled data form, in half, and computes the sum of the difference amplitudes between the overlaid samples. This procedure is repeated for each of a plurality of different fold locations, and these sums representing the asymmetry of the distribution about the associated fold point, are stored as a function of the fold point to determine the point in the distribution having the smallest sum, i.e. the greatest symmetry. This point of maximum symmetry provides an indication of the direction of arrival of the radio wave.

25 Claims, 6 Drawing Figures

DIFFERENCE PATTERN OUTPUT

SUM PATTERN OUTPUT TO RECEIVER

ROTOR
STATOR

DIRECTIONAL PATTERN OF RECEPTION AT 8.0MHz FOR MONOPOLE AERIAL SYSTEM 8.0MHz

AZIMUTH

RADIO DIRECTION FINDING

This invention relates to radio direction finding, and more particularly, to methods and apparatus for processing signals from directional radio receiving means, to provide an indication of the direction of arrival of received radio signals.

The invention is particularly concerned with radio direction finding systems employing so-called wide aperture directional aerial systems of the kind in which the arriving wave front is sampled at a plurality of spatial intervals, extending over a distance comparable with, or greater than, the wavelengths of the arriving wave front, and these samples combined to form a directional pattern of reception in a given plane, which is symmetrical about the direction of maximum sensitivity or directivity of the aerial system in that plane. This direction of maximum sensitivity may either be the direction of maximum or minimum signal response of the aerial system, depending on the manner in which the signal samples are combined.

The simplest and most common way of combining the signal samples, is to add the signals together to produce a directional pattern of reception, known as a sum pattern, having a large single main lobe and a number of minor side lobes, the axis of the main lobe representing the direction of maximum sensitivity of the system.

A common alternative way of combining the signal samples is to combine corresponding samples from opposite halves of the sampling point distribution, in opposition, so as to produce a directional pattern of reception, known as a difference pattern, having a central minimum defined between two major side lobes. In this case the axis of this minimum is the direction of maximum sensitivity of the aerial system.

In operation, the directional pattern of reception of the aerial system is varied, usually by rotation thereof, using any of a number of different known methods depending upon the size and form of the aerial system. The output of the aerial system is then applied to a receiver and the output of the receiver processed to determine the direction of arrival of radio waves in a selected frequency range to which the receiver is tuned.

In a conventional manual mode of operation of a wide aperture direction finding system, both sum and difference pattern outputs are derived from the aerial system using a pair of frequency locked receivers, and displayed simultaneously one above the other, on an A-display of a cathode ray tube. The manual operator places a cursor symmetrically in the center of the central null position of the displayed difference pattern, using the maximum of the displayed sum pattern to distinguish the 'boresight' null from other nulls in the difference pattern.

For a perfect continuous radio wave arriving from one direction only under ideal propagating conditions, the displayed patterns will correspond closely to the sum and difference patterns of the aerial system, and the operator will have no difficulty in positioning the cursor to obtain an accurate indication of the direction of arrival of the radio wave. However, as is well known, the arriving radio wave will normally be subject to disturbances and distortion due to various causes on its way from the transmitter to the aerial system, particularly where the wave has been reflected by the ionosphere. In addition to this, a large proportion of direction finding tasks involve non-continuous, on-off keyed transmissions, for example in Morse Code, which tend to leave silence gaps in the displayed patterns.

Thus the displayed information from which a manual direction finder operator is required to measure the direction of arrival of a radio wave is usually far from perfect, having no stable central maximum or minimum in the displayed sum and difference patterns respectively. An operator must therefore rely on a certain degree of skill in positioning the cursor, using an intuitive assessment of the overall shape of the displayed patterns in the region of the 'boresight' null.

It will be clear from this that any automatic direction finding system which relies solely on the determination of the minimum ordinate of a difference pattern or the maximum ordinate of a sum pattern, to derive an indication of the direction of arrival of the radio wave will rarely be able to produce an accurate result.

It is an object of the present invention to provide a method of determining the direction of arrival of a radio wave, in which the output signal of the directional receiving means is processed in a manner which simulates the methods of a direction finding operator presented with the same information in displayed form.

According to the present invention, there is provided a method of determining the direction of arrival of a radio wave received by directional receiving means of the kind comprising, a wide aperture directional aerial system having a directional pattern of reception in a given plane, substantially symmetrical about the direction of maximum sensitivity thereof in said plane, and a receiver coupled to the aerial system; the method comprising varying the direction of maximum sensitivity of the aerial system; detecting the amplitude of the receiver output signal during variations in said direction of maximum sensitivity of the aerial system, whereby to produce a representation of the amplitude distribution of the receiver output signal as a function of the direction of maximum sensitivity of the aerial system; and computing the point about which said amplitude distribution is most symmetrical, whereby to provide an estimate of the direction of arrival of the radio wave.

The invention arises from the realization by the inventors that in measuring the direction of arrival of the radio wave, the operator of a manual direction finding system of the kind in which the amplitude distribution of the output signal of the receiving means, as a function of the direction of maximum sensitivity of the aerial system is displayed on a cathode ray tube, is sensitive to the symmetry of the displayed pattern.

Preferably the said point about which the amplitude distribution is most symmetrical, is computed by a method comprising the steps of calculating an asymmetry value for each of a number of different positions in the amplitude distribution, by summing, at each of the different positions, the differences in magnitude between the predetermined number of corresponding samples located symmetrically on opposite sides of the position, and determining the point in the distribution corresponding to the lowest asymmetry value, for example by interpolation of the calculated asymmetry values.

As mentioned above, the direction of maximum sensitivity of the aerial system may be represented either by a maximum or a minimum in the directional pattern of reception of the aerial system. However, it is generally preferred to use aerial systems in which the direction of maximum sensitivity is represented by a maximum, ie the sum pattern produced by summation of the wave front samples, since in this way higher signal-to-noise ratios can generally be achieved.

In such applications, asymmetry values are preferably calculated only for points lying within a limited region of the amplitude distribution centered on the maximum ordinate thereof which, it will be appreciated, is only an approximate estimate of the direction of arrival of the radio wave. This avoids the possibility of ambiguous results in applications in which a representation of the amplitude distribution of the receiver output signals is produced for a full 360° angular variation. This is because the 360° directional sum pattern of the aerial system is symmetrical about its maximum ordinate, as well as about a point 180° from it. In addition the total amount of signal processing is considerably reduced.

Preferably the direction of maximum sensitivity of the aerial system is varied cyclically, whereby to cause the aerial system to repeatedly scan the whole of, or a predetermined sector of, said given plane. Preferably also the said stored representation of the output signal of the receiving means is derived from samples of the said output signal collected during a plurality of successive scans of the aerial system, a procedure hereinafter termed pre-processing.

In this way, the effects of on-off keying, or other short-term variations in the strength of the detected radio wave are effectively smoothed out.

This pre-processing of the output signal from the receiver may be effected by sampling the output signal at regular intervals during successive scans of the aerial system, and deriving said representation of the amplitude distribution of the output signal by a process comprising the steps of altering the value of each sample of the first scan by an amount proportional to the difference in magnitude between it and the corresponding sample of the next successive scan to produce a set of modified scan samples, and updating the values of the modified set of scan samples by repeating the above step for each successive scan, starting each time with the set of modified samples as updated by the corresponding samples of the preceding scan.

Preferably, in each of said process steps, any sample of the next successive scan which is less than a predetermined proportion of the magnitude of the corresponding sample of the existing set of samples, is ignored. This process effectively constitutes the application of a recursive low-pass digital filtering process to the output of the receiver.

The representation derived by these steps from a predetermined number of scans of the aerial system may then be used to compute a single estimate of the direction of arrival of the radio wave. However, in a preferred embodiment of the invention, this pre-processing is carried out continuously in real time, and a number of separate estimates are computed, each from the updated representation produced by the process after regular intervals of time, each interval corresponding to a predetermined number of complete scans of the aerial system.

The mean value of a number of these separate estimates may then be averaged to provide a more accurate final estimate of the direction of arrival of the radio wave, and the standard deviation of these estimates used to produce an indication of the probable error of the final estimate.

According to a second aspect of the present invention, automatic radio direction finding apparatus includes directional receiving means comprising a wide-aperture directional aerial system whose directional pattern of reception in a given plane, is substantially symmetrical about the direction of maximum sensitivity thereof in said plane, means for varying the direction of maximum sensitivity of the aerial system, and a radio receiver coupled to the aerial system, the apparatus further including signal processing means arranged to detect the amplitude of the receiver output signal during variations in the direction of maximum sensitivity of the aerial system, to derive and store a representation of the amplitude distribution of said output signal as a function of the direction of maximum sensitivity, and to compute the point about which said amplitude distribution is most symmetrical, whereby to provide an estimate of the direction of arrival of a radio wave received by the aerial system in a frequency band to which the receiver is tuned.

Preferably, said signal processing means comprises computer means, programmed to compute the said point about which the amplitude distribution is most symmetrical by a method as aforesaid in accordance with the first aspect of the invention.

Preferably the said direction of maximum sensitivity is represented by a maximum in the directional pattern of reception of the aerial system, the computer means then preferably being arranged to compute asymmetry values only for a limited region of said amplitude distribution centered on the maximum ordinate thereof.

In a preferred form of direction finding apparatus in accordance with the present invention, said means for varying the direction of maximum sensitivity of the aerial system is arranged to cyclically vary the direction of maximum sensitivity, for example by rotation of, the directional pattern of the reception, whereby to cause the aerial system to repeatedly scan the whole of, or a predetermined sector of said given plane, and the signal processing means is arranged to derive said representation of the amplitude distribution from amplitude samples of the output signal of the receiver taken during a plurality of successive scans of the aerial system, preferably by a process as aforesaid in accordance with the first aspect of the invention.

This process may conveniently be carried out continuously in real time, the signal processing means being programmed to compute a separate estimate of the direction of arrival of the received radio waves from each of a number of different samples of the stored representation taken at regular time intervals, each interval preferably corresponding to a predetermined number of complete scans of the aerial system.

Thus, a number of separate estimates of the direction of arrival of the same wave will be produced over a period of time.

The signal processing means is then preferably arranged to store and then compute the mean value of a number of these separate estimates, and to compute their standard deviation, so as to provide a final, more accurate estimate of the direction of arrival of the radio wave, together with an indication of the probable error of the final estimate.

It will be appreciated that the invention also includes within its scope signal processing apparatus adapted for use in automatic radio direction finding apparatus of the above kind.

The invention will now be described in greater detail, by way of example only, with reference to the accompanying drawings, of which:

The automatic direction finding system to be described is a permanent ground-based system for detecting the direction of arrival, in the azimuthal plane, of radio signals received in the high frequency HF band. Its primary function is in automatically determining the bearings of distant radio transmitters by receiving signals propagated therefrom via the ionosphere.

Figure 1:
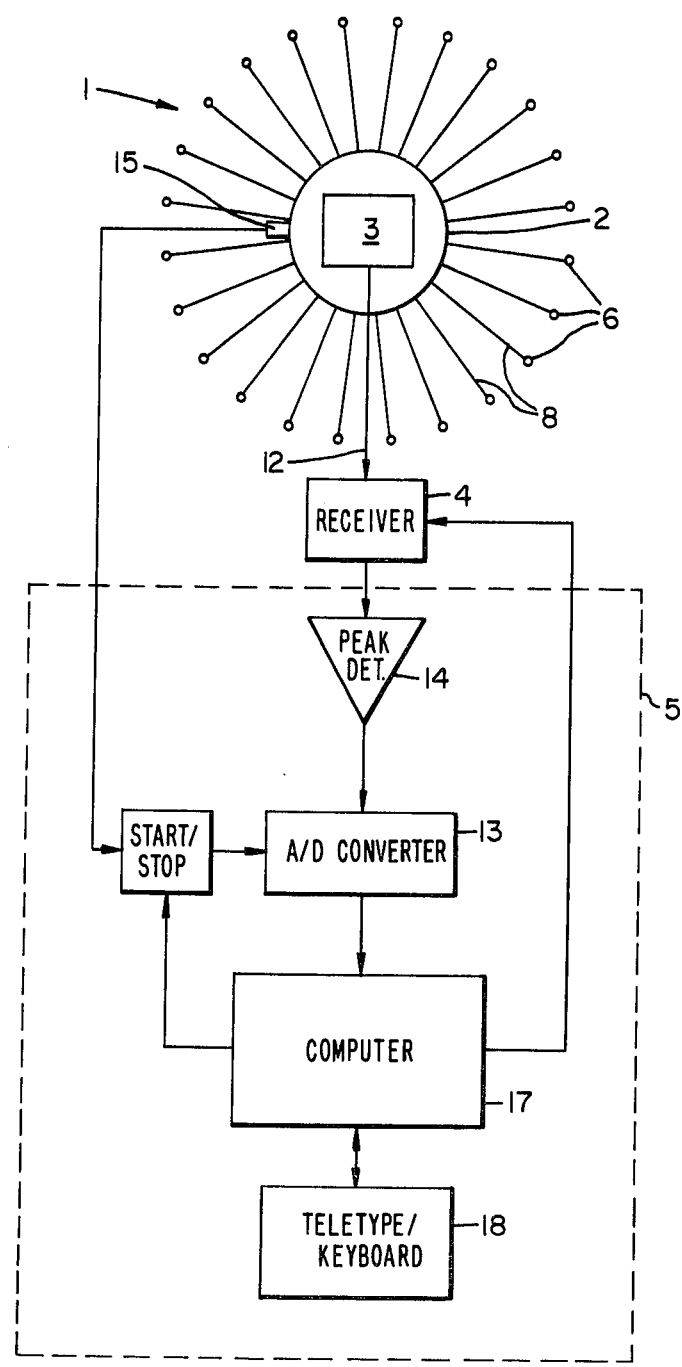
FIG. 1 is a schematic diagram of an automatic radio direction finding system in accordance with the present invention.

Referring to the drawings, the system shown in FIG. 1 essentially comprises a, fixed wide-aperture circular directional aerial system 1, spinning goniometer 2 and beam-forming network 3, a radio receiver 4 coupled to the output of the beam forming network 3, and signal processing apparatus 5 for processing the signals from the receiver 4 to produce an indication of the direction of arrival of radio signals received by the aerial system 1.

The aerial system, designed for operation in the 1.5 to 10 MHz region of the HF band, in its basic form comprises an array of 24 vertical aerial elements 6 equally spaced around the circumference of a circle of 150 m diameter. Each aerial element 6 is in the form of an elevated feed monopole 12 m high, with its feed point approximately 3 m above ground so as to be quarter-wave resonant at mid band.

24 coaxial feeder cables 8 of equal electrical length connect the aerial monopole elements 6 to the capacity-type spinning goniometer 2 and beam forming network 3 located at, or near the center of the circular aerial array. The goniometer and beam forming network 3 are shown in greater detail in FIG. 2. The stator of the goniometer comprises 24 circularly disposed stator plates 9 to which respective ones of the 24 coaxial feeder cables 8 are connected. The rotor of the goniometer 2 carries 24 separate rotor plates 10, capacitatively coupled to, and spanning a group of eight of the stator plates 9 corresponding to a 120° sector of the aerial array 1. The outputs of the 24 rotor plates 10, representing signals from eight of the aerial elements 6, are combined in the beam forming network 3, which vectorially sums and phase-corrects the signals for the curvature of the array so as to produce a directional pattern or polar diagram of reception equivalent to the sum pattern of a broadside linear array.

The beam forming network 3 comprises a chain of 23 hybrid transformer units 11 which separately sum the signals from each half of the goniometer rotor and apply the two resulting summation signals to the side ports of the final hybrid transformer unit 11 of the chain. In the present example, the required output is taken from the sum port of this final hybrid transformer unit to provide the sum pattern output from the aerial system 1 for application to the receiver 4. Conversely the difference pattern output may be derived from the difference part of this final hybrid transformer unit of the beam forming network.

Figure 2:
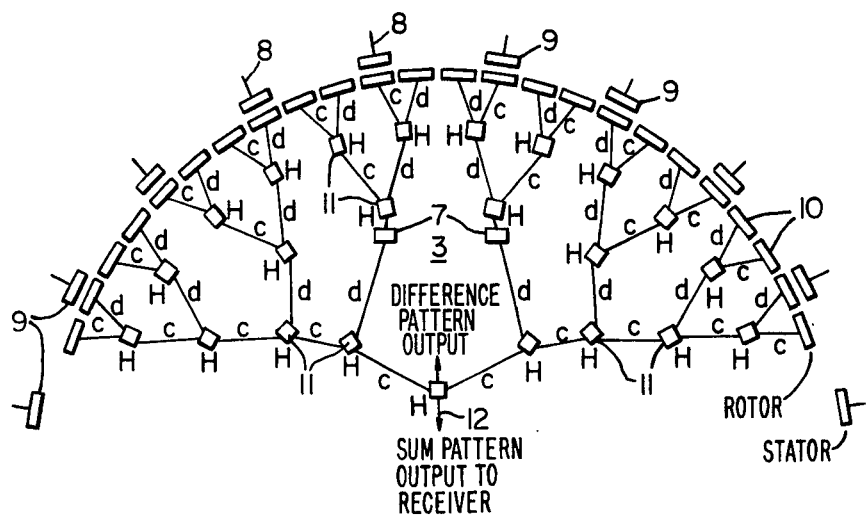
FIG. 2 is a block circuit diagram of a beam forming network incorporated in the direction finding system of FIG. 1.

Phase correction of the signals derived from the aerial elements 6, to compensate for the curvature of the aerial array is achieved by providing different electrical path lengths within the beam forming network 3 for signals from different plates 10 of the goniometer rotor. In FIG. 2, the cables designated o are ordinary connecting cables, while the cables designated d are delay cables arranged to introduce an appropriate delay into the signal paths. It will be seen that signals from the outermost rotor plates 10 are connected to the final hybrid transformer unit of the beam forming network entirely by cables designated c, representing a minimum delay, while progressively increasing delays are introduced into the paths of signals from the other rotor plates up to a maximum for the two central rotor plates.

The arrangement is such that the delay introduced by the beam forming network to the signal from each one of the rotor plates 10 corresponds to the free space distance between the chord joining the outermost aerial elements spanned by the goniometer rotor and the point on the circumference of the aerial array corresponding in position to the particular goniometer rotor plate.

Thus for a signal arriving in the direction of the perpendicular bisector of the chord joining the outermost elements of the sector spanned by the rotor of the goniometer 2 all the voltages derived from these elements of the sector are summed in phase by the beam forming network. Attenuators 7 are provided in the path of signals from the 8 innermost rotor plates 10 to compensate for the smaller number of hybrid transformer units 11 in the path of these signals.

Figure 3:
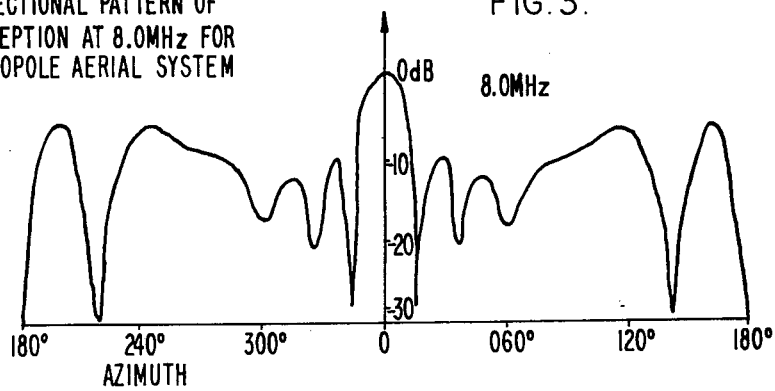
FIG. 3 is a graphical diagram showing the directional sensitivity, in the horizontal plane, of the aerial system of the direction finding system of FIG. 1.

The 8.0 MHz azimuthal directional pattern of reception of the aerial system 1, for a 15° elevation angle of reception is shown in solid lines in FIG. 3. As mentioned above this directional pattern of reception is similar to that of a linear array of monopoles, and is symmetrical about a main central lobe the axis of which represents the direction of maximum sensitivity of the aerial system.

Rotation of the rotor of the goniometer 2 at a fixed speed effectively causes this directional pattern of reception to rotate so that the beam of the aerial system repeatedly scans the whole of the azimuthal plane. A shaft position encoder 15, accurate to within half a degree, produces a digital representation of the instantaneous orientation of the goniometer rotor with respect to true north and thus of the bearing direction of maximum signal response or sensitivity of the aerial system 1.

The summed output from the beam forming network 3 is fed by means of a transmission cable 12 to the receiver 4 which is tuned to a selected frequency and bandwidth. The amplitude of the output signal from the receiver is detected by a peak detector 14 which produces an output signal varying in amplitude with the waveform envelope of the receiver output signal. The output of the peak detector 14 is then converted into digital form by an analogue-to-digital converter 13 (A/D converter) to which the digital output of the goniometer shaft position encoder 15 is also applied. The A/D converter samples the amplitude of the output of the peak detector 14 at regular azimuthal intervals of the goniometer rotation, converts these samples into digital form, and feeds them, as a function of the goniometer rotation angle, to a computer 17.

The amplitude discrimination and sampling rate of the A/D converter 13 required to preserve all the incident signal information are determined respectively by the expected maximum signal-to-noise ratio of the receiver output, and by a combination of the maximum receiver bandwidth and goniometer rotation rate. The amplitude discrimination is based on 1 bit for each multiple of 6 dB in the expected maximum signal-to-noise ratio, and although adequate amplitude discrimination is provided by a 6-bit A/D converter, a 7-bit A/D converter speeds the system reaction time by allowing the receiver output signal to be sampled before the initial AGC action of the receiver is complete.

In the present application, the goniometer rotation rate is fixed at 500 rpm, and for a maximum bandwidth of 1.2 KHz, sampling at 1.2° intervals would be required. However, since the tendency is to use narrower bandwidths, with an optimum between 200 and 600 Hz, for the frequency band of 1.5–10 MHz a sampling interval of 2° is considered adequate.

The computer 17 is provided with a keyboard/teletype control terminal 18 through which the operation of the direction finding system is automatically controlled. Receiver frequency, specified to 10 Hz, is selected by a 7-digit keyboard entry, and the receiver is automatically tuned by the computer. Receiver bandwidth, appropriate to the selected frequency, is also selected by a keyboard entry. At lower frequencies, narrower receiver bandwidths are generally used to reduce the possibility of interference errors produced by two signals arriving in the same frequency band.

The computer 17 is programmed to carry out 3 basic stages of processing the samples from the A/D converter 13. The first stage is a pre-processing stage designed to minimize the effects of on-off keying (eg Morse signals) and fast fading of the received signals. This is achieved by detecting and collecting useful signal energy over a number of successive revolutions of the goniometer 3 and effectively applying a recursive low pass digital filtering process to corresponding data samples from successive revolutions of the goniometer so as to build up, over a period of time, a stored digital representation of the amplitude distribution of the receiver output signals as a function of the goniometer rotor orientation, ie the azimuthal bearing.

This pre-processing is carried out in real time so that the stored digital representation is continuously updated. At regular intervals, for example, after every fourth goniometer revolution, the current stored digital representation is applied to the second computer processing stage, the bearing algorithm, during which a snap bearing estimate for each representation of the amplitude distribution of the receiver output signal applied to it, is computed. Thus, after 64 revolutions of the goniometer 3, a total number of 16 snap bearing estimates will be produced.

Successive snap bearing estimates are then passed to the third computer processing stage, the data editing stage, which stores, and analyzes the azimuthal distribution of the snap bearing estimates to produce a final bearing estimate together with a confidence indicator indicating the reliability of this final estimate.

In a first mode of operation, depression of an activity button on the keyboard terminal unit 18 actuates the computer 17 to automatically collect and process data from a fixed number of revolutions of the goniometer and to produce a final bearing estimate or estimates from this data. Alternatively in a second mode of operation, the activity button may be pressed a number of times up to a maximum of say 8 times, data being collected each time for the length of time the button is depressed, up to an upper time limit of, say, 8 seconds. A separate final bearing estimate is produced for each depression of the button. Data can thus be collected over a greater period of time.

Figure 4:
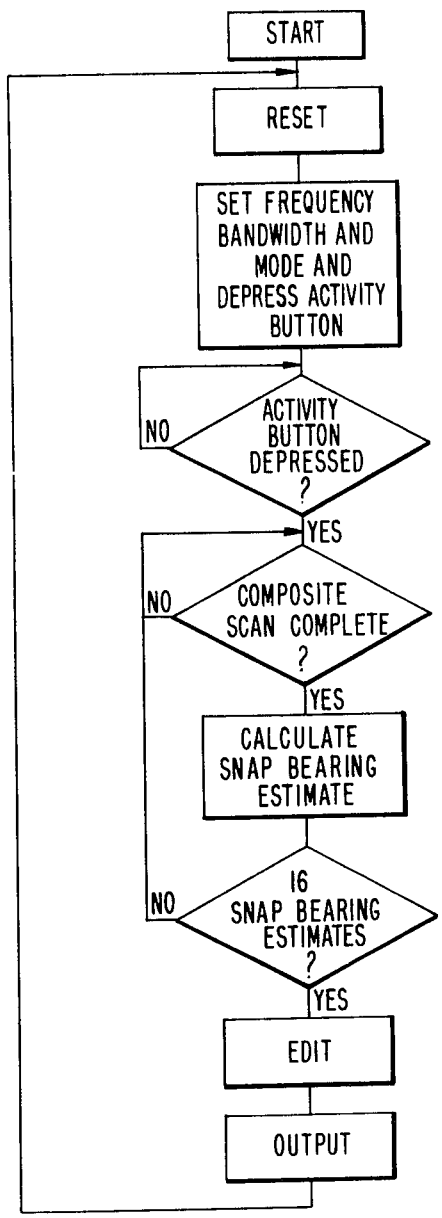
FIG. 4 is a flow chart for the signal processing apparatus of the direction finding system of FIG. 1.

Each of the 3 computer processing stages will now be described in detail with reference to FIGS. 4 to 6 of the drawings of which FIG. 4 shows a flow chart of the system in its first mode of operation. Upon starting, the system is automatically reset, the receiver bandwidth and frequency are then selected through the keyboard of the terminal unit 18. The appropriate mode of operation is then selected, say the first mode, and the activity button depressed. Successive samples of the amplitude of the receiver output signal as a function of azimuth are fed from the A/D converter 13 to the first stage (the data pre-processing stage) of the computer 17 during the next 64 revolutions of the goniometer 2. As described above, the A/D converter 13 samples the receiver output at 2° intervals, so that there are 180 samples for each full revolution of the goniometer, The 180 samples derived from the first goniometer revolution are each stored as a function of azimuthal angle in a respective one of 180 storage locations designated to it, thus providing a stored representation of the azimuthal amplitude distribution of the receiver output signal during the first goniometer revolution.

The magnitude of each one of the stored samples is then compared in turn with the magnitude of the corresponding sample derived during the second goniometer revolution and each stored sample is then modified by an amount equal to one quarter of the difference in magnitude between it and the corresponding sample of the second goniometer revolution. However, any sample of the second goniometer revolution which is less than a quarter of the magnitude of the corresponding stored sample is ignored. The process is then continuously repeated in real time for the next 62 successive revolutions of the goniometer, the stored set of samples being repeatedly updated in value in accordance with the values of corresponding samples of each successive goniometer revolution.

At regular intervals, in the present example after every multiple of 4 goniometer revolutions called a composite scan, the updated stored set of samples, which provides a digital representation of the amplitude distribution of the receiver output signal as a function of azimuth, smoothed out over a period of time, is applied to the second stage of the computer process—the bearing algorithm.

It will be apparent that if a single, good quality radio signal at the selected frequency is present, the shape of the azimuthal amplitude distribution of the stored set of samples derived from the pre-processing stage after a single composite scan will correspond closely to the directional pattern of reception of the aerial system at the selected frequency, and should therefore be substantially symmetrical about a point in the distribution corresponding to the direction of arrival of the radio signal. Thus determination of the point about which the distribution is most symmetrical should provide a fairly accurate estimate of the direction of arrival of the radio signal. It is the purpose of the bearing algorithm to estimate the azimuthal position of this point.

Essentially this algorithm produces a snap bearing estimate from each set of samples applied to it by determining the azimuthal point in the region of the maximum ordinate, or sample value of the distribution, about which the distribution is most symmetrical. The maximum sample value of the distribution is selected, being an approximate estimate of the signal bearing and an asymmetry value is computed for each sample point within an azimuthal window of 30° centered on this maximum ordinate and encompassing the main lobe of the distribution.

The asymmetry value for each sample point within the window, working from one side of the window to the other, say in a clockwise direction, is computed by summing the differences in magnitude between corresponding samples of the whole distribution on either side of the sample point. Thus all the pattern information contained in the distribution is used in deriving each asymmetry value. This method is equivalent to folding the distribution about each sample point within the 30° window and computing the sum of the differences between overlaid samples of the whole distribution on opposite sides of the folding point.

An asymmetry scan of the asymmetry values as a function of azimuth over the 30° window is then generated. For a perfectly symmetrical distribution, the asymmetry value will be zero at the location of the bearing, which in turn will be the maximum ordinate of the distribution. However, this is rarely the case, and an azimuthal plot of asymmetry values for a typical distribution is shown in FIG. 5 for a distribution generally symmetrical about 90.9° bearing.

Figure 5:
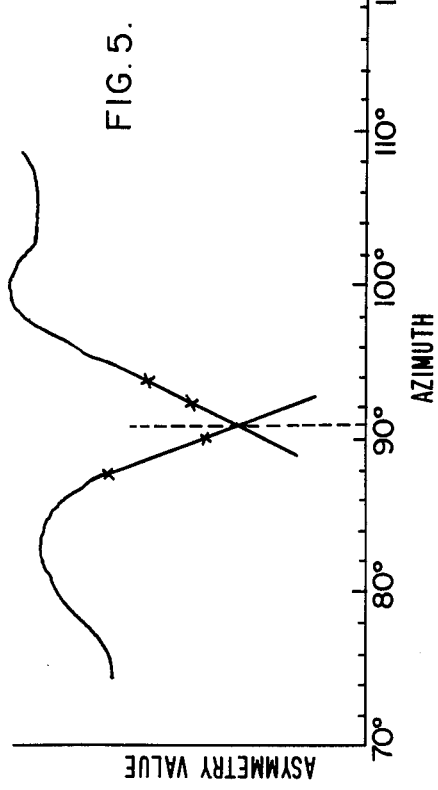
FIG. 5 is a graphical diagram illustrating a process step of the signal processing apparatus.

As illustrated in FIG. 5, the lowest four values of the asymmetry scan are then selected and a linear interpolation is used to locate the azimuthal position corresponding to the minimum value. This azimuthal position is a snap bearing estimate, and a separate snap bearing estimate is produced by the bearing algorithm for each set of amplitude samples applied to it up to a total of 16 snap bearing estimates from the 64 goniometer revolutions. The 16 snap bearing estimates are then applied to the data editing stage of the computer process, where they are stored. However, any snap bearing estimate in which the sum of the ordinates comprising the asymmetry scan is identical with the preceding estimate, indicating that the transmitter has ceased transmitting, is ignored.

Figure 6:
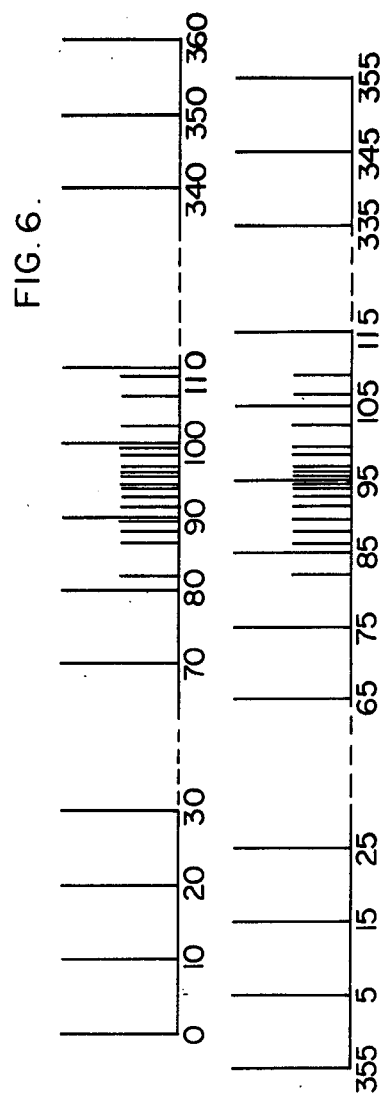
FIG. 6 is a diagram showing a further processing step of the signal processing apparatus.

During the third (data editing) stage of the computer process, the azimuthal distribution of the remaining snap bearing estimates is then explored by counting the numbers of bearing estimates which fall into each of two sets of overlapping azimuthal sectors or bins as illustrated in FIG. 6. Each bin is 10° wide, a figure which is related to the anticipated snap bearing estimate distribution and interference effects. Each set of bins covers the full 360° sweep in the azimuthal plane, the first set of bins covering the arcs 000° to 010°, 010° to 020°, ... 350° to 000°; and the second set of bins, covers the arcs 005° to 015°, 015° to 025°, ... 350° to 005°. FIG. 6 also shows how the distribution of a set of 16 snap bearing estimates are sorted into the two sets of bins.

It will be seen that the bin containing the largest number of snap bearing estimates is the 90° to 100° bin of the first set of bins. The distribution of the snap bearing estimates in this bin is then averaged to provide a final bearing estimate by adding together the azimuthal values of each snap bearing estimate in the bin and dividing by the number of snap bearing estimates in the bin. The standard deviation of this average value is also computed, and in order to provide a meaningful "confidence indicator", this standard deviation is weighted by multiplying it by a factor of 100/n, where n is the number of snap bearing estimates in the bin. Clearly the maximum number of estimates is 16, and the minimum number allowed is set at 4 in this particular example, any final bearing estimate computed on the basis of less than 4 snap bearing estimates in a bin, is considered to be insufficiently accurate.

Having computed a bearing value and confidence indicator for the bin containing the largest number of snap bearing estimates, the two bins of the other set which overlap this bin, ie bins covering arcs 085° to 095° and 095° to 105°, are excluded. The bin containing the next highest number of snap bearing estimates is then chosen and another final bearing value and confidence indicator are computed in the same way for this bin, providing it contains four or more snap bearing estimates.

Consequently it is possible that a total of 4 separate final bearing values or estimates, together with associated confidence indicators may be produced, although such an occurrence is highly unlikely. In the present illustrated example, the remaining bin containing the next highest number of snap bearing estimates is the 080° to 090° bin containing 4 snap bearing estimates. The averaging process is applied to this snap bearing estimate distribution and a bearing value together with a confidence indicator is computed. Obviously because there are fewer snap bearing estimates more widely distributed in this bin, the confidence indicator for this bearing value will be considerably higher indicating a lower reliability. No other bins containing 4 or more snap bearing estimates remain in the illustrated distribution.

In the second mode of operation, the data pre-processing and bearing algorithm are carried out in much the same way as in the first mode of operation. A separate snap bearing estimate is calculated for every complete composite scan of the goniometer, while the activity button is depressed. Incomplete composite scans are ignored, and the pre-processing store is automatically cleared at the end of each activity period. Editing is carried out separately for snap bearing estimates produced on each depression of the activity button, to produce each time a separate final bearing value and confidence indicator.

However, during the data editing, the requirement for a minimum number of four snap bearing estimates in any bin is relaxed, since there is no minimum time constraint on data collection, and it is possible to obtain only a single composite scan taking approximately 0.48 seconds. In addition only one bearing value is calculated for each depression of the activity button.

The final output is presented by means of the keyboard/teletype terminal unit 18, or alternatively through a visual display unit. It consists of a bearing value or values to the nearest 0.1°, with their appropriate confidence indicators, timed to the nearest second at which the activity button was depressed, together with receiver frequencies and bandwidth.

Various refinements may be incorporated into the system to improve its performance and accuracy. For example, the computer may be programmed to automatically calibrate the receiver for the effects of the group delay of its selective circuits, ie the narrow band filters, prior to the collection of signal information. This may be achieved by synthesizing and inputting to the receiver a 1 MHz signal having a symmetrical triangular envelope waveform, the apex of which is centered on a known bearing. The receiver output during four scans of the goniometer are applied to the computer, and a single snap bearing estimate computed. The difference between this computed snap bearing estimate and the known bearing, is determined, and this difference applied as a bearing correction to subsequent results.

The frequency range of the system will depend on the diameter of the aerial array 1. For higher frequencies a smaller diameter aerial array is required, while lower frequencies require a larger array. Furthermore, the frequency range of the present system may conveniently be extended, for example, to cover in addition the frequency range 10–30 MHz by providing a second circular array of physically shorter aerial elements, on a smaller diameter disposed concentrically within the existing array. A separate goniometer and beam forming network is used together with beam selection equipment for automatically selecting the appropriate aerial system in dependence upon whether the frequency selected is above or below 10 MHz.

The directivity of the aerial system, or systems, may be improved by providing an additional monopole to each monopole of the existing array, to form a doublet element. In the embodiment described above, each additional monopole may be erected at a radial separation of about 11 m on the inside or outside of the existing monopole, although erection on the inside is preferred since it will cause fewer siting problems. The outputs from the monopole of each doublet are combined in a hybrid transformer unit and the difference port output is connected to the existing feeder cable. An additional length of coaxial cable is inserted between the inner monopole and the hybrid unit to introduce a delay equivalent to the free space distance between the monopoles of the doublet. The use of this doublet configuration effectively reduces the side lobe levels of the directional sum pattern of reception of the aerial system.

It will be appreciated that, although circularly disposed aerial systems of the kind described above are preferred for their inherent symmetry and simplicity, the invention may also be applied to automatic direction finding systems employing any suitable form of variable directivity wide aperture aerial system having a substantially symmetrical directional pattern of reception. Furthermore, although the primary application of the invention is to direction finding systems in which the beam of the aerial system is arranged to scan the whole of a given plane, as in the described embodiment, the invention may readily be applied, with suitable adaption, to systems in which the aerial system scans only a limited sector of a plane.

We claim:

1. A method of determining the direction of arrival of radio wave received by directional receiving means of the kind comprising, a wide aperture directional aerial system having a directional pattern of reception in a given plane, substantially symmetrical about the direction of maximum sensitivity thereof in said plane, and a receiver coupled to the aerial system; the method comprising varying the direction of maximum sensitivity of the aerial system; detecting the amplitude of the receiver output signal during variations in said direction of maximum sensitivity of the aerial system, whereby to produce a representation of the amplitude distribution of the receiver output signal as a function of the direction of maximum sensitivity of the aerial system; and computing the point about which said amplitude distribution is most symmetrical, whereby to provide an estimate of the direction of arrival of the radio wave.

2. A method as claimed in claim 1, wherein the said point about which the amplitude distribution is most symmetrical, is computed by a method comprising the steps of calculating an asymmetry value of each of a number of different positions in the amplitude distribution, by summing, at each of the different positions, the differences in magnitude between a predetermined number of corresponding samples located symmetrically on opposite sides of the position, and determining the point in the distribution corresponding to the lowest asymmetry value.

3. A method as claimed in claim 2, wherein the direction of maximum sensitivity of the aerial system is represented by a maximum in the said directional pattern of reception, and asymmetry values are calculated only for points lying within a limited region of the amplitude distribution centred on the maximum ordinate thereof.

4. A method as claimed in claim 1 wherein the direction of maximum sensitivity of the aerial system is varied cyclically, whereby to cause the aerial system to repeatedly scan the whole of, or a predetermined sector of, said given plane.

5. A method as claimed in claim 4, wherein a stored representation of the receiver output signal is derived from samples of the said output signal collected during a plurality of successive scans of the aerial system.

6. A method as claimed in claim 5, wherein said samples of the receiver output signal are collected at regular intervals during successive scans of the aerial system, and the representation of the amplitude distribution of the output signal is derived by a process comprising the steps of altering the value of each sample of a first scan by an amount proportional to the difference in magnitude between it and the corresponding sample of the next successive scan to produce a set of modified scan samples, and updating the values of the modified set of scan samples by repeating the above step for each successive scan, starting each time with the set of modified samples as updated by the corresponding samples of the preceding scan.

7. A method as claimed in claim 6, wherein, in each step of said steps, any sample of the next successive scan which is less than a predetermined proportion of the magnitude of the corresponding sample of the existing set of samples, is ignored.

8. A method as claimed in claim 6, wherein a number of separate estimates are computed in real time each from the updated representation of the receiver output signal produced by said process after regular intervals of time, so that successive representations are derived from samples collected over progressively increasing numbers of complete scans of the aerial system.

9. A method as claimed in claim 8, wherein the mean value of a number of said separate estimates is determined to provide a more accurate final estimate of the direction of arrival of the radio wave.

10. A method as claimed in claim 9, wherein the standard deviation of the number of separate estimates from which the final estimate is derived, is used to provide an indication of the probable error of the final estimate.

11. Automatic radio direction finding apparatus including directional receiving means comprising a wide-aperture directional aerial system where directional pattern of reception in a given plane, is substantially symmetrical about the direction of maximum sensitivity thereof in said plane, means for varying the direction of maximum sensitivity of the aerial system, and a radio receiver coupled to the aerial system; the apparatus further including signal processing means arranged to detect the amplitude of the receiver output signal during variations in the direction of maximum sensitivity of the aerial system, to derive and store a representation of the amplitude distribution of said output signal as a function of the direction of maximum sensitivity, and means for computing the point about which said amplitude distribution is most symmetrical, whereby to provide an estimate of the direction of arrival of a radio wave received by the aerial system in a frequency hand to which the receiver is tuned.

12. Automatic radio direction finding apparatus as claimed in claim 11, wherein the signal processing means comprises computer means programmed to compute the said point about which the amplitude distribution is most symmetrical by a method comprising the steps of calculating an asymmetry value for each of a number of different positions in the amplitude distribution, by summing, at each of the different positions, the differences in magnitude between a predetermined number of corresponding samples located symmetrically on opposite sides of the position, and determining the point in the distribution corresponding to the lowest asymmetry value.

13. Automatic radio direction finding apparatus as claimed in claim 12, wherein the direction of maximum sensitivity of the aerial system is represented by a maximum in the directional pattern of reception, and the computer means is arranged to compute asymmetry values only for a limited region of said amplitude distribution centered on the maximum oridinate thereof.

14. Automatic radio direction finding apparatus as claimed in claim 11 wherein said means for varying the direction of maximum sensitivity of the aerial system is operative to cyclically vary the direction of maximum sensitivity whereby to cause the aerial system to repeatedly scan the whole of, or a predetermined sector of, said given plane.

15. Automatic radio direction finding apparatus as claimed in claim 14, wherein the signal processing means is operative to derive said representation of the amplitude distribution from amplitude samples of the output signal of the receiver taken during a plurality of successive scans of the aerial system.

16. Automatic radio direction finding apparatus as claimed in claim 15, wherein the signal processing means is operative to collect said samples of the receiver output signal by sampling it at regular intervals during successive scans of the aerial system, and then to derive the representation of the amplitude distribution of the receiver output signal by a process comprising the steps of altering the value of each sample of a first scan by an amount proportional to the difference in magnitude between it and the corresponding sample of the next successive scan to produce a set of modified scan samples, and updating the values of the modified set of scan samples by repeating the above step for each successive scan, starting each time with the set of modified samples as updated by the corresponding samples of the preceding scan.

17. Automatic radio direction finding apparatus as claimed in claim 16, wherein the signal processing means is operative to ignore, in each of said process steps, any sample of said next successive scan which is less than a predetermined proportion of the magnitude of the corresponding sample of the existing set of samples.

18. Automatic radio directing finding apparatus as claimed in claim 17, wherein the signal processing means is operative to compute a number of separate estimates in real time, each from the updated representation produced by the said process after regular intervals of time such that successive representations, and the estimates computed from them, are derived from samples collected over progressively increasing numbers of complete scans of the aerial system.

19. Automatic radio direction finding apparatus as claimed in claim 18, wherein the signal processing means is operative to store, and then compute the mean value of, a number of separate estimates to provide a more accurate final estimate of the direction of arrival of the radio wave.

20. Automatic radio direction finding apparatus as claimed in claim 19, wherein the signal processing means is operative to compute the standard deviation of the number of separate estimates from which said final estimate is derived, to provide an indication of its probable error.

21. Automatic radio direction finding apparatus as claimed in claim 11 wherein the aerial system comprises an array of aerial elements circularly disposed in said given plane.

22. Automatic radio direction finding apparatus as claimed in claim 21, wherein said aerial elements comprise monopole elements.

23. Automatic radio direction finding system as claimed in claim 21, wherein each aerial element is a doublet element comprising two monopole elements aligned in a radial direction.

24. Automatic radio direction finding apparatus as claimed in claim 21, wherein each element of the aerial array is connected to a spinning goniometer the output signals from which are applied to a beam forming network arranged to vectorially combine and phase correct them for the curvature of the aerial array.

25. Automatic radio direction finding apparatus as claimed in claim 24, wherein said aerial system includes two concentric circularly disposed arrays of aerial elements convering mutually adjacent frequency bands, and each associated with a separate goniometer and beam forming network, the apparatus further including beam selection apparatus for automatically selecting the signal from the appropriate aerial array covering the frequency band in which said radio wave lies.

* * * * *

Disclaimer 4,163,978.—*Eric G. Shepherd* and *Roger D. Spragg*, Cheltenham, England. RADIO DIRECTION FINDING. Patent dated Aug. 7, 1979. Disclaimer filed July 27, 1982, by the assignee, *The Secretary of State for Defence in Her Britannic Majesty's Government of the United Kingdom of Great Britain and Northern Ireland.*

Hereby enters this disclaimer to claims 1, 4, 11 and 14 of said patent.

[*Official Gazette September 21, 1982.*]